(12) United States Patent
Bhiungade et al.

(10) Patent No.: US 12,220,967 B2
(45) Date of Patent: Feb. 11, 2025

(54) VANE CONTROLLER ASSEMBLY FOR AN AIR VENT

(71) Applicant: Faurecia India Private Limited, Maharashtra (IN)

(72) Inventors: Santosh Bhiungade, Maharashtra (IN); Ibitwar Swapnil, Maharashtra (IN)

(73) Assignee: FAURECIA INDIA PRIVATE LIMITED, Maharashtra (IN)

( * ) Notice: Subject to any disclaimer, the term of this patent is extended or adjusted under 35 U.S.C. 154(b) by 383 days.

(21) Appl. No.: 17/727,236

(22) Filed: Apr. 22, 2022

(65) Prior Publication Data

US 2022/0363104 A1 Nov. 17, 2022

(30) Foreign Application Priority Data

Apr. 22, 2021 (IN) .............................. 202121018706

(51) Int. Cl.
*B60H 1/00* (2006.01)
*B60H 1/34* (2006.01)

(52) U.S. Cl.
CPC ......... *B60H 1/0065* (2013.01); *B60H 1/3421* (2013.01); *B60H 2001/3471* (2013.01)

(58) Field of Classification Search
CPC ....................................................... G05G 5/16
See application file for complete search history.

(56) References Cited

U.S. PATENT DOCUMENTS

2017/0259649 A1* 9/2017 Shibata ................ B60H 1/3421

* cited by examiner

*Primary Examiner* — Edelmira Bosques
*Assistant Examiner* — Michael James Giordano
(74) *Attorney, Agent, or Firm* — Reising Ethington P.C.

(57) ABSTRACT

A vane controller assembly for an air vent of a vehicle. Vane controller assembly includes a deco panel adapted to be fitted in the air vent, and a knob movably coupled to the deco panel using a shaft. The vane controller assembly includes an elastic member having a body portion that has a hole, and protrusion(s) configured on an outer surface of the body portion, which is adapted to engage and lock with a slot provided at a first end of the knob. The shaft passes through the hole of the body portion of the elastic member such that the elastic member is slidably and rotatably engaged with the shaft, and allows a user to adjust orientation of vanes of vane controller assembly in a required direction.

10 Claims, 8 Drawing Sheets

VANE CONTROLLER ASSEMBLY FOR AN AIR VENT

TECHNICAL FIELD

The present disclosure relates to the field of air vent systems for automobiles. More particularly, the present disclosure relates to a simple, efficient, and robust vane controller assembly for air vents of vehicles, and the likes, to provide multi-directional airflow inside the vehicles, which provides enhanced effort management, and reduced noise and damages to the components of the vane controller assembly.

BACKGROUND

Background description includes information that may be useful in understanding the present invention. It is not an admission that any of the information provided herein is prior art or relevant to the presently claimed invention, or that any publication specifically or implicitly referenced is prior art.

Vehicles are equipped with vane controller assembly being coupled to an air vent of heating system, ventilation system, or air conditioning system (or HVAC system), in an interior of vehicles to control the direction and inflow rate of air inside the vehicles. The air vane controllers are normally found to be movably mounted around an axis secured to a dashboard, roof, rear side of the front seats, and other interior surfaces of the vehicles.

Existing vane controller assembly for air vents of vehicles includes multiple vanes or deflectors being movably connected to a peripheral wall of the body of the air vent in both vertical and horizontal directions. The deflectors are configured with a control device that includes a control member (knob) slidably mounted along a mounting rod through an elastic member, such that the knob is maneuverable by a user to modify the orientation of the deflectors to adjust direction and rate of airflow inside the vehicle. In the existing vane controller assembly, the elastic member is configured between an outer surface of the mounting rod and the knob to slidably and rotatably couple the mounting rod with the knob.

Normally, a small interference between the mounting rod and the elastic member is required for good effort in rotation and translation of the mounting rod using the knob. However, many times due to manufacturing defects or due to external weathering conditions, the materials of the elastic member and/or the mounting rod may undergo physical changes, which may either increase the interference between the mounting rod and the knob or may create a gap between them, resulting in inefficient or no movement of the mounting rod/deflectors upon adjustment of the knob.

If a complete gap is created between the knob and the mounting rod, the elastic member might come out while translating by the knob. Also, the elastic member may start rotating along with the mounting rod, which does not help manage and transfer the effort applied by the user on the knob, to the mounting rod. Further, if there is no gap between the knob and the mounting rod, the interference between them increases, which may restrict the sliding or translational motion of the mounting rod. This may lead to rubbing of the elastic member while sliding and creating noise. Further, the elastic member, as well as the mounting rod, may also twist, deform, and get damaged due to the increased interference.

In addition, the existing vane controller assembly does not provide a wider range of maneuverability to users due to the structural limitations associated with the design of the elastic member, as well as the configuration of the elastic member with the knob and the mounting rod.

There is therefore a need to overcome the above drawbacks and provide a simple, efficient, robust, easy to operate and assemble, and improved vane controller assembly controller for air vents of vehicles to provide multi-directional airflow inside the vehicles, and. Further, there is a need in the art to provide a structurally improved elastic member for the vane controller of air vents, which enhances effort management, reduces noise and damages to the components of the vane controller, and efficiently facilitate translational and rotational movement of the mounting rod as well as the deflectors of the vane controller upon movement of the knob.

OBJECTS OF THE PRESENT DISCLOSURE

Some of the objects of the present disclosure, which at least one embodiment herein satisfies are as listed herein below.

It is an object of the present disclosure to provide a vane controller assembly to facilitate multi-directional airflow inside vehicles using a single controller.

It is an object of the present disclosure to provide a vane controller assembly that is capable of efficiently accommodate multiple horizontal and vertical vanes, and facilitate efficient maneuverability of the multiple horizontal and vertical vanes.

It is an object of the present disclosure to provide a simple, efficient, robust, easy to operate and assemble, and improved vane controller assembly controller for air vents of vehicles.

It is an object of the present disclosure to enhance effort management, and reduce noise creation and damages to the components of the vane controller.

It is an object of the present disclosure to provide a structurally improved elastic member for the vane controller.

It is an object of the present disclosure to provide a structurally improved elastic member for the vane controller of air vents, which enhances effort management, reduces noise and damages to the components of the vane controller, and efficiently facilitate translational and rotational movement of the mounting rod as well as the deflectors of the vane controller upon movement of the knob.

It is an object of the present disclosure to provide an improved air vent assembly for vehicles, which is slim in profile, and aesthetically pleasing.

SUMMARY

The present disclosure relates to the field of air vent systems for automobiles. More particularly, the present disclosure relates to a simple, efficient, and robust vane controller assembly for air vents of vehicles to provide multi-directional airflow inside the vehicles, which provides enhanced effort management, and reduced noise and damages to the components of the vane controller assembly.

An aspect of the present disclosure pertains to a vane controller assembly for an air vent. The vane controller assembly may comprise a deco panel for fitment in the air vent, and a knob movably coupled to the deco panel using a shaft. The vane controller assembly may comprise an elastic member comprising a body portion having a hole, and protrusion(s) or extended portions configured on an outer surface of the body portion, and adapted to engage with or lock in the slot of the knob. The shaft may be adapted to movably couple the knob to the deco panel, and may pass through the hole of the body portion of the elastic member to slidably and rotatably engage the elastic member and knob with the shaft.

In an aspect, an inner surface of the hole of the elastic member or an outer surface of the shaft may have a profile such that a portion of the inner surface of the hole may be in contact with the shaft, and a gap may be created between another portion of the inner surface of the hole and the shaft. This configuration may enable an efficient slidable as well as rotational engagement between the knob and the shaft, which facilitate efficient translational and rotational movement of the shaft as well as the vanes of the vane controller upon movement of the knob, thereby enhancing effort management, reducing noise, and limiting wearing or damages to the components of the vane controller assembly.

In an aspect, an inner surface of the hole of the elastic member may have a profile such that a portion of the inner surface of the hole is in contact with the shaft, and a gap is created between another portion of the inner surface of the hole and the shaft. The portion of the inner surface of the hole may have a curved profile corresponding to the outer surface of the shaft, and the other portion of the inner surface of the hole may have a flat profile.

In another aspect, an outer surface of the shaft may have a profile such that a portion of the outer surface of the shaft is in contact with the inner surface of the hole, and a gap is created between another portion of the outer surface of the shaft and the inner surface of the hole. The portion of the outer surface of the shaft may have a curved profile corresponding to the inner surface of the hole, and the other portion of the outer surface of the shaft may have a flat profile.

In an aspect, the protrusions or extended portions of the elastic member may be extending along a length of the outer surface of the body portion of the elastic member. Further, in another aspect, the protrusions may be configured at predefined positions on the outer surface of the body portion of the elastic member, which may facilitate engagement or locking of the elastic member with the slot of the knob, and may also enhance the rotational angle range of the knob as well as the vanes around an axis of the shaft.

In an aspect, the vane controller assembly may comprise a horizontal link movably configured with the knob to accommodate multiple horizontal vanes, and a vertical link movably configured with the knob to accommodate multiple vertical vanes. The vertical vanes and the horizontal vanes may be movably configured with the deco panel and the knob such that a second end of the knob may facilitate a user to adjustment of the orientation of any or a combination of the vertical vanes and the horizontal vanes at a predefined angle with the deco panel, thereby providing a multi-directional inflow of air inside the vehicle.

BRIEF DESCRIPTION OF DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure. The diagrams are for illustration only, which thus is not a limitation of the present disclosure.

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1A:
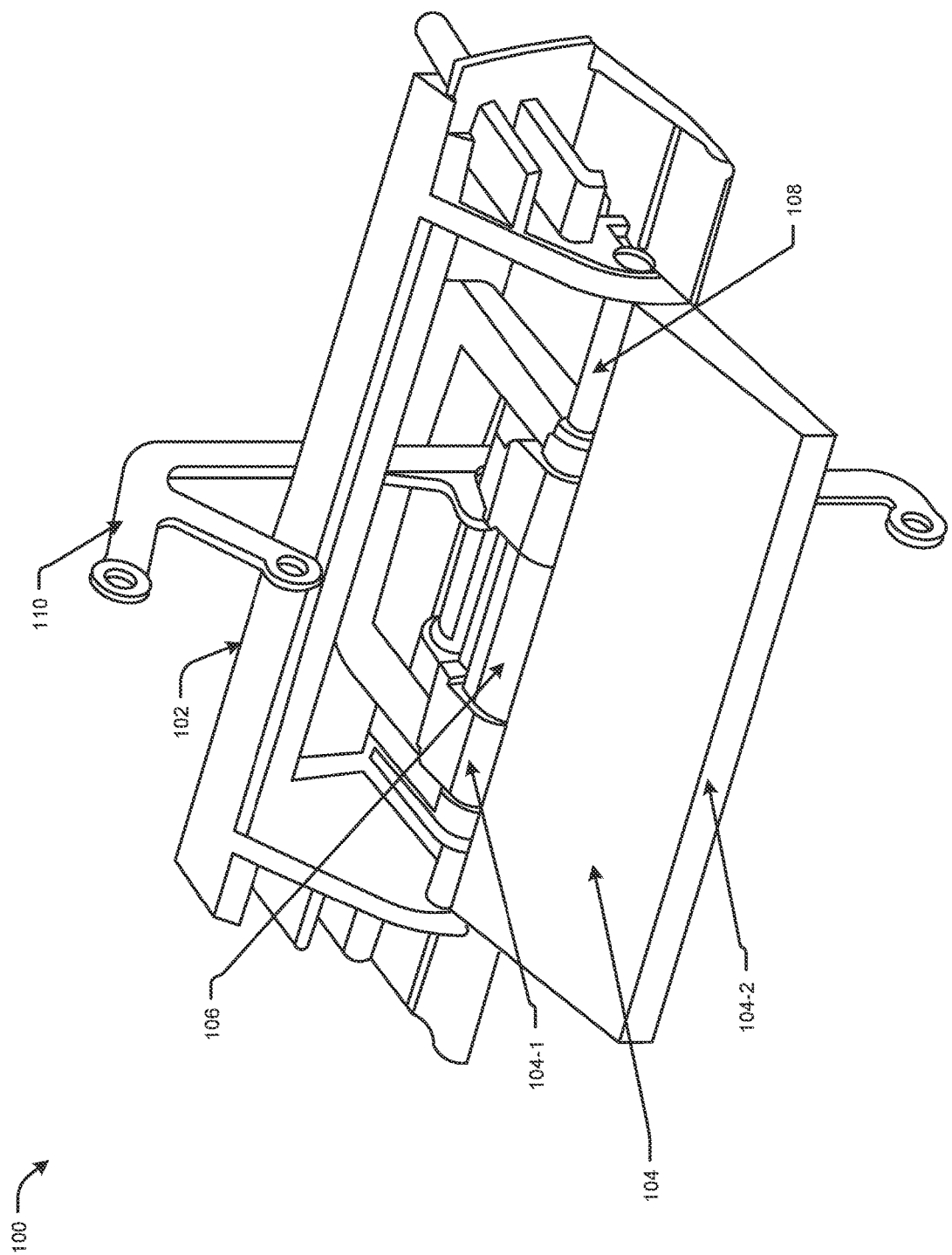
FIG. 1A illustrates an exemplary view of the proposed vane controller assembly, in accordance with an embodiment of the present invention.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

The present disclosure relates to the field of air vent systems for automobiles. More particularly, the present disclosure relates to a simple, efficient, and robust vane controller assembly for air vents of vehicles to provide multi-directional airflow inside the vehicles, which provides enhanced effort management, and reduced noise and damages to the components of the vane controller assembly.

According to an embodiment, the present disclosure elaborates upon a vane controller assembly for an air vent. The vane controller assembly can include a deco panel for fitment in the air vent, and a knob movably coupled to the deco panel using a shaft. The vane controller assembly can include an elastic member comprising a body portion having a hole, and one or more protrusions configured on an outer surface of the body portion and adapted to engage with the slot of the knob. The shaft can be adapted to movably couple the knob to the deco panel, can pass through the hole of the body portion of the elastic member such that the elastic member is slidably and rotatably engaged with the shaft.

In an embodiment, an inner surface of the hole of the elastic member can have a profile such that a portion of the inner surface of the hole is in contact with the shaft, and a gap is created between another portion of the inner surface of the hole and the shaft. The portion of the inner surface of the hole can have a curved profile corresponding to the outer surface of the shaft, and the other portion of the inner surface of the hole can have a flat profile.

In another embodiment, an outer surface of the shaft can have a profile such that a portion of the outer surface of the shaft is in contact with the inner surface of the hole, and a gap is created between another portion of the outer surface of the shaft and the inner surface of hole. The portion of the outer surface of the shaft can have a curved profile corresponding to the inner surface of the hole, and the other portion of the outer surface of the shaft can have a flat profile.

In an embodiment, the one or more protrusions can be extending along a length of the outer surface of the body portion of the elastic member. In another embodiment, the one or more protrusions can be configured at one or more predefined positions on the outer surface of the body portion of the elastic member.

In an embodiment, the elastic member can be made of an elastic material selected from silicon, rubber, and polymers. The shaft can be made of a material selected from plastic, metal, and alloys.

In an embodiment, the vane controller assembly can include a set of vertical vanes and a set of horizontal vanes, movably configured with the deco panel and the knob such that a second end of the knob facilitates adjustment of orientation of any or a combination of the set of vertical vanes and the set of horizontal vanes at a predefined angle with the deco panel.

In an embodiment, the vane controller assembly can include a horizontal link movably configured with the knob, and adapted to accommodate the set of horizontal vanes. Further, the vane controller assembly can include a vertical link movably configured with the knob, and adapted to accommodate the set of vertical vanes.

Figure 1B:
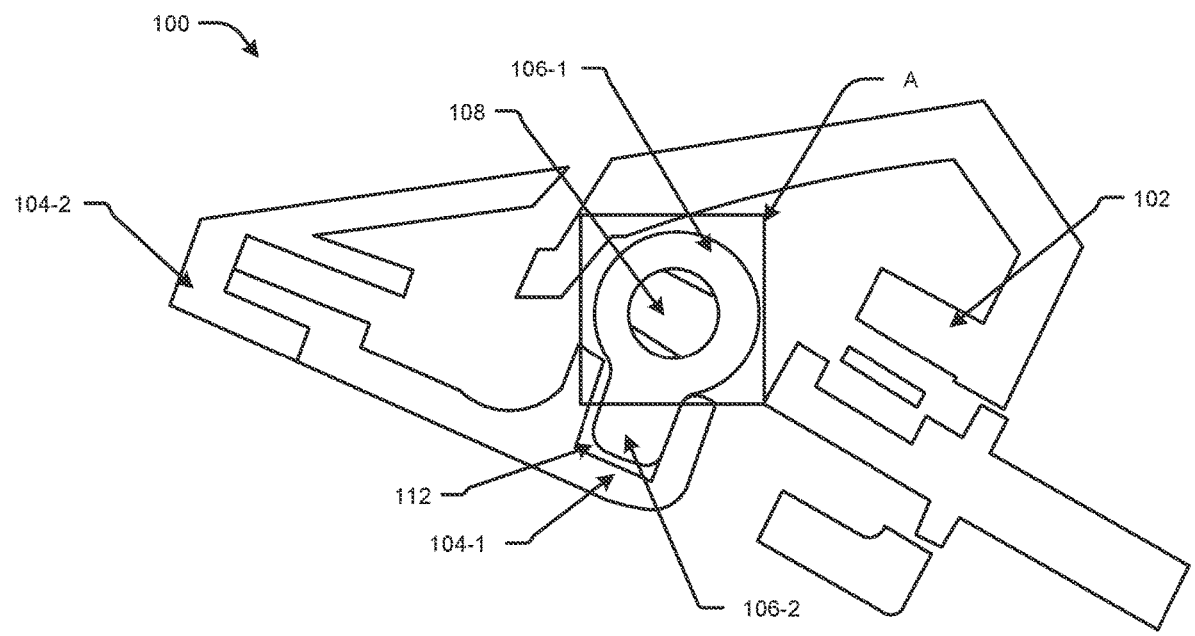
FIGS. 1B-1C illustrates exemplary side views of the proposed vane controller assembly of FIG. 1A.
Figure 1C:
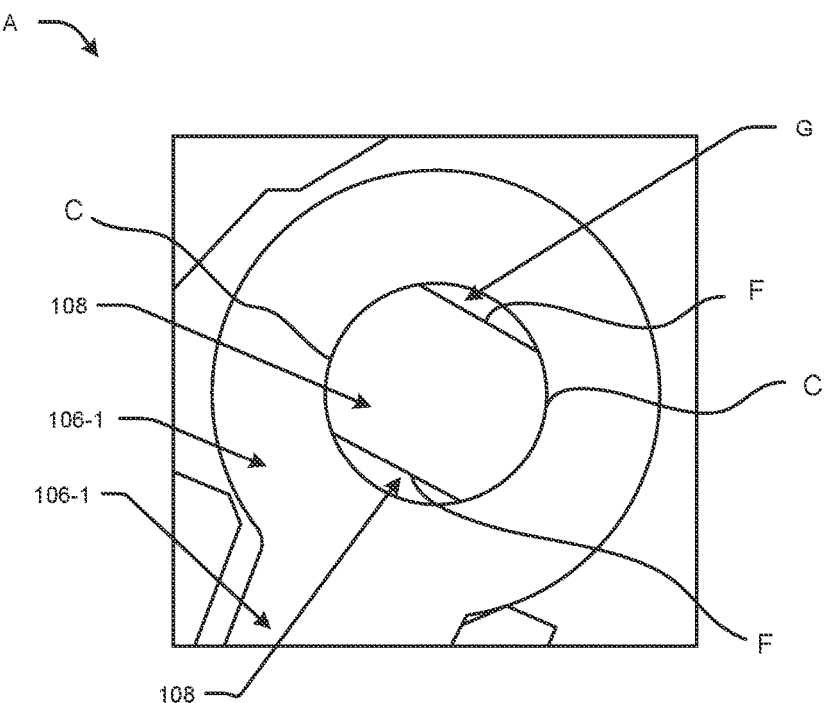

Referring to FIGS. 1A to 1C, the proposed vane controller assembly 100 (also referred to as vane controller 100, or assembly 100 herein) for air vent of vehicles can include a deco panel 102 for fitment in the air vent, and a knob 104 (also referred to as controller 104, herein) movably coupled to the deco panel 102 using a shaft 108. The knob 104 can have a first end 104-1 provided with a slot 112, and a second end 104-2 to facilitate maneuverability of the knob 104 by a user. In an embodiment, the vane controller assembly 100 can include an elastic member 106 comprising an annular-shaped body portion 106-1 having a hole, and one or more protrusions 106-2 (also referred to as protrusion 106-2 or an extended portion 106-2, herein) configured on an outer surface of the body portion 106-1 and adapted to engage with and lock in the slot 112 of the knob 104. The shaft 108 can be adapted to movably couple the knob 104 to the deco panel 102, and can pass through the hole of the body portion 106-1 of the elastic member 106 such that the elastic member 106 is slidably and rotatably engaged with the shaft 108. Further, the user can slidably or translationally as well as rotationally move the knob 104 around an axis of the shaft 108 using the second end 104-2 of the knob 104.

In an embodiment, an inner surface of the hole of the elastic member 106 or an outer surface of the shaft 108 can have a profile such that a portion of the inner surface of the hole of the elastic member 106 can be in contact with the shaft 108, and a gap can be created between another portion of the inner surface of the hole of the elastic member 106 and the shaft 108. This configuration can provide a required and interference to enable an efficient slidable as well as rotational engagement between the knob 104 and the shaft 108, which can facilitate efficient translational and rotational movement of the shaft 108, as well as the vanes of the vane controller assembly 100 upon movement of the knob 104 by the user, thereby enhancing effort management, reducing noise, and limiting wearing or damages to the components of the vane controller assembly 100.

Figure 3A:
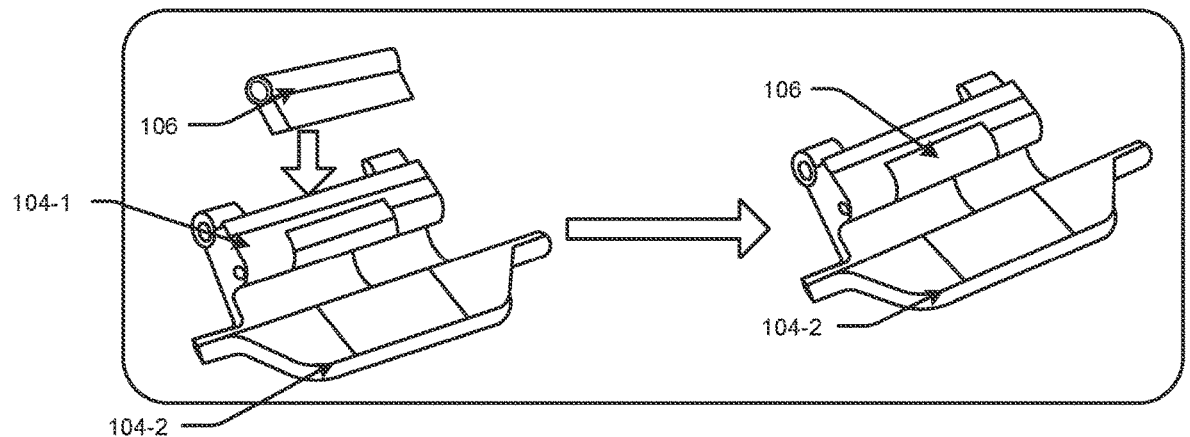
FIGS. 3A-3J illustrate exemplary views of the steps involved in assembling the proposed vane controller, in accordance with an embodiment of the present invention.
Figure 3B:
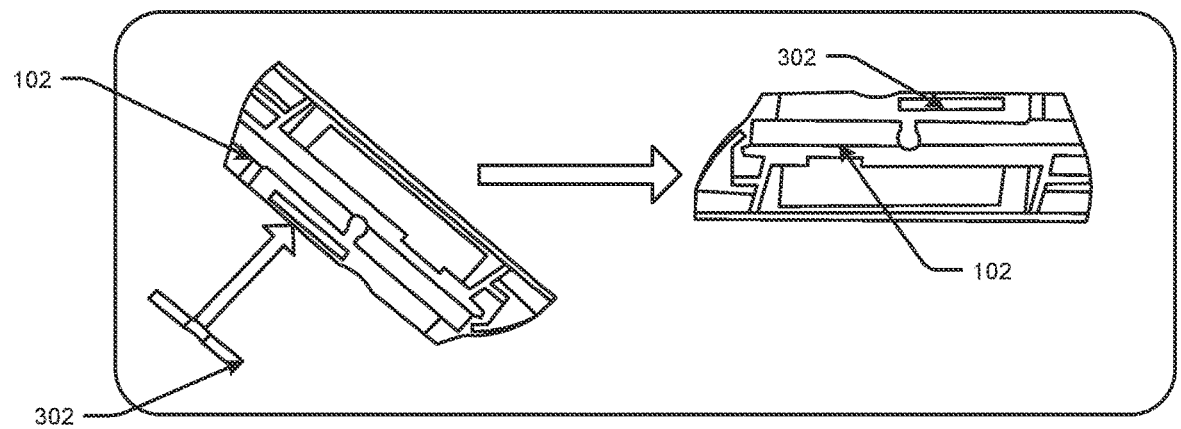
Figure 3C:
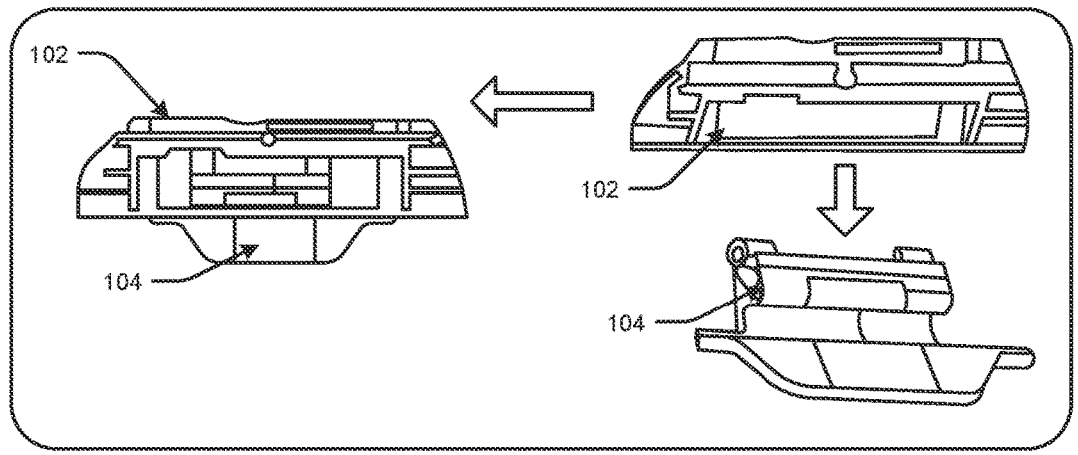
Figure 3D:
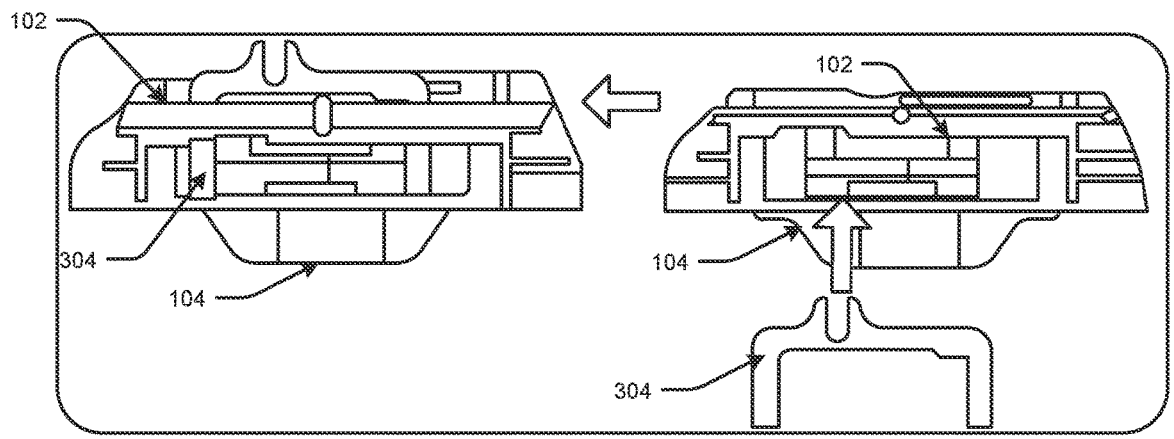
Figure 3E:
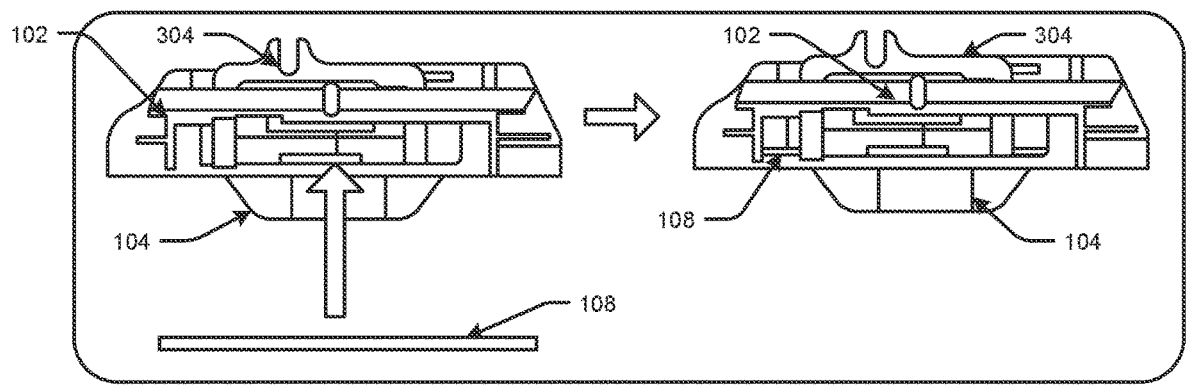
Figure 3F:
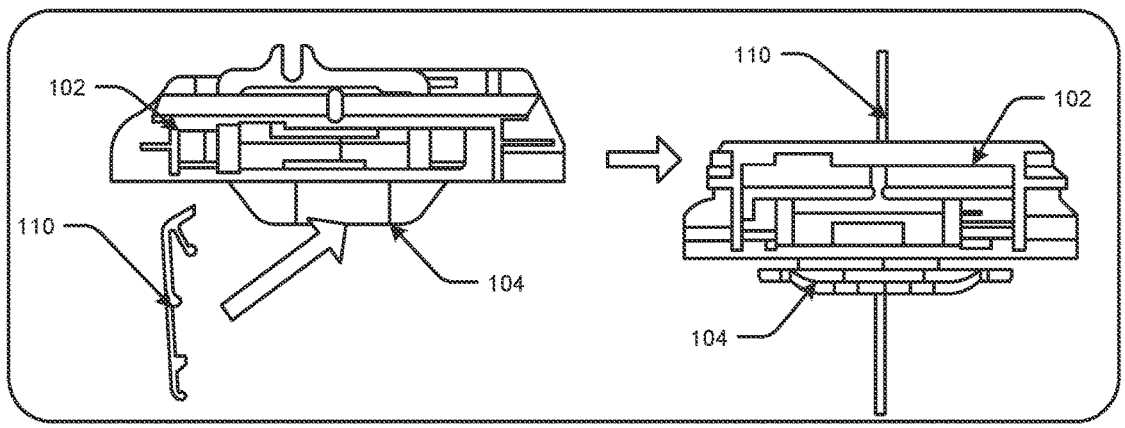
Figure 3G:
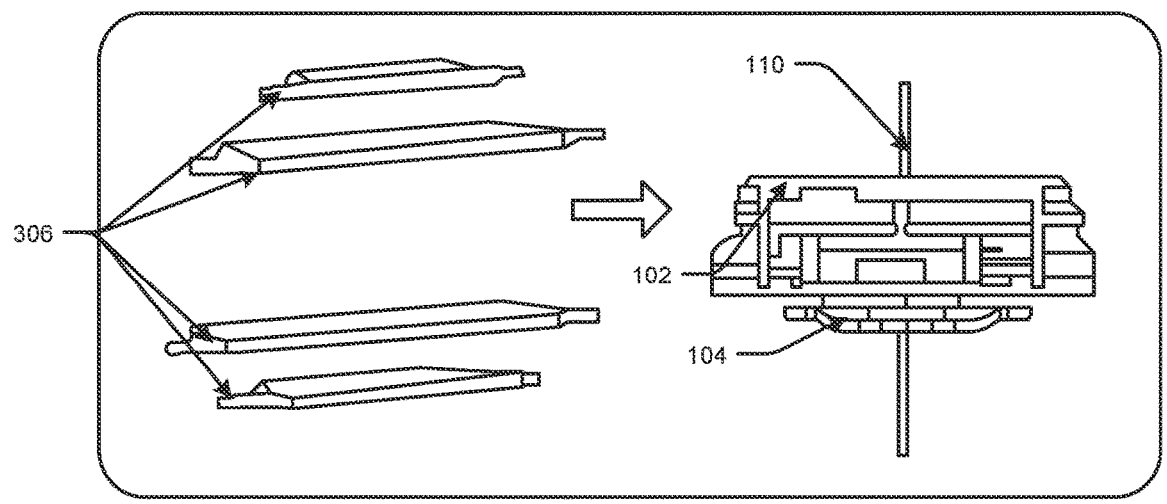
Figure 3H:
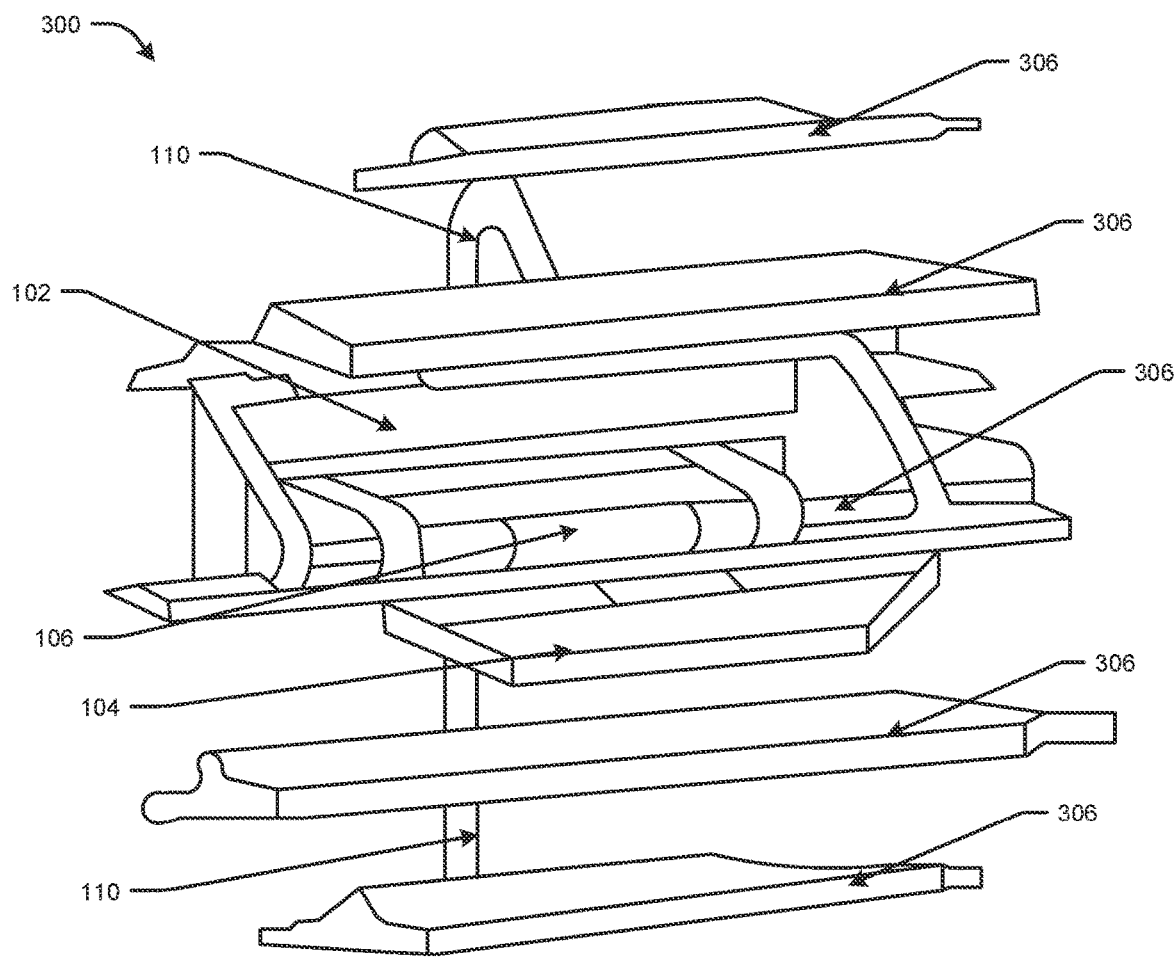
Figure 3I:
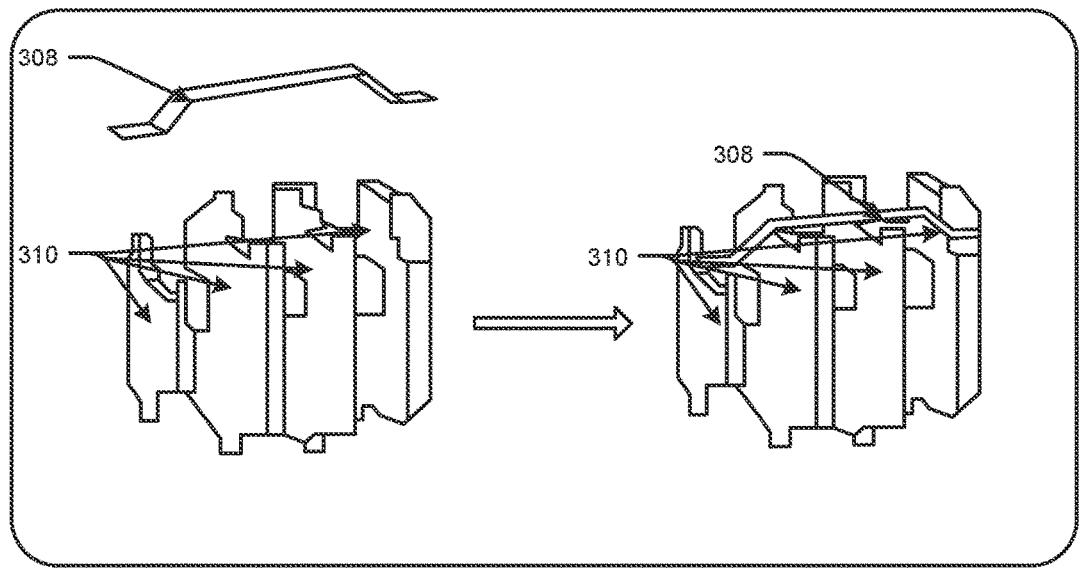

In an embodiment, as illustrated in FIGS. 1A, 3H, and 3I, and the vane controller assembly 100, 300 can include a horizontal link 110 movably configured with the knob 104, and configured to accommodate multiple horizontal vanes 306 at required distances therebetween. The vane controller assembly 100 can further include a vertical link 310 movably configured with the knob 104 and configured to accommodate multiple vertical vanes 310 at required distances therebetween. The vertical vanes 310 and the horizontal vanes 306 can be movably configured with the deco panel 102, and the knob 104 such that a second end 104-2 of the knob 104 can facilitate a user in the adjustment of the orientation of any or a combination of the vertical vanes 310 and the horizontal vanes 306 at a predefined angle with the deco panel 102, thereby providing a multi-directional inflow of air inside the vehicle.

In an embodiment, the body portion of the elastic member 106 can be annular in shape having a cylindrical-shaped hole extending therewithin. Further, an outer surface of the shaft 108 can have a profile such that a portion of the outer surface of the shaft 108 can be in contact with the inner surface of the hole of the elastic member 106, and a gap is created between another portion of the outer surface of the shaft 108 and the inner surface of the hole of the elastic member 106. As illustrated in FIG. 1C, in an exemplary embodiment, first portions of the outer surface of the shaft 108 can have a curved profile (C) corresponding to the inner surface of the hole of the elastic member 106 such that the curved (first) portions C of the shaft 108 are in contact with the inner surface of the hole of the elastic member 106, and second portions of the outer surface of the shaft can have a flat profile (F) such that gaps (G) are created between the flat (second) portions F of the shaft 108 and the inner surface of the hole of the elastic member 106. It is to be appreciated by a person skilled in the art that this configuration provides sufficient interference between the shaft 108 and the elastic member 106, to enable the efficient slidable as well as rotational engagement between the knob 104 and the shaft 108, which can further facilitate efficient translational and rotational movement of the shaft 108, as well as the vanes 306, 310 of the vane controller assembly 100 upon movement of the knob 104 by the user, thereby enhancing effort management, reducing noise, and limiting wearing or damages to the components of the vane controller assembly 100.

In another embodiment (not shown), the shaft 108 can be cylindrical in shape, and an inner surface of the hole of the elastic member 106 can have a profile such that a portion of the inner surface of the hole of the elastic member 106 can be in contact with the outer cylindrical surface of the shaft 108, and gaps can be created between another portion of the inner surface of the hole of the elastic member 106 and the outer cylindrical surface of the shaft 108.

In an exemplary embodiment, the elastic member 106 can be made of an elastic material selected from silicon, rubber, and polymers. The shaft 108, and the horizontal vanes 306, and the vertical vanes 310 can be made of a material selected from plastic, metal, and alloys.

Figure 2A:
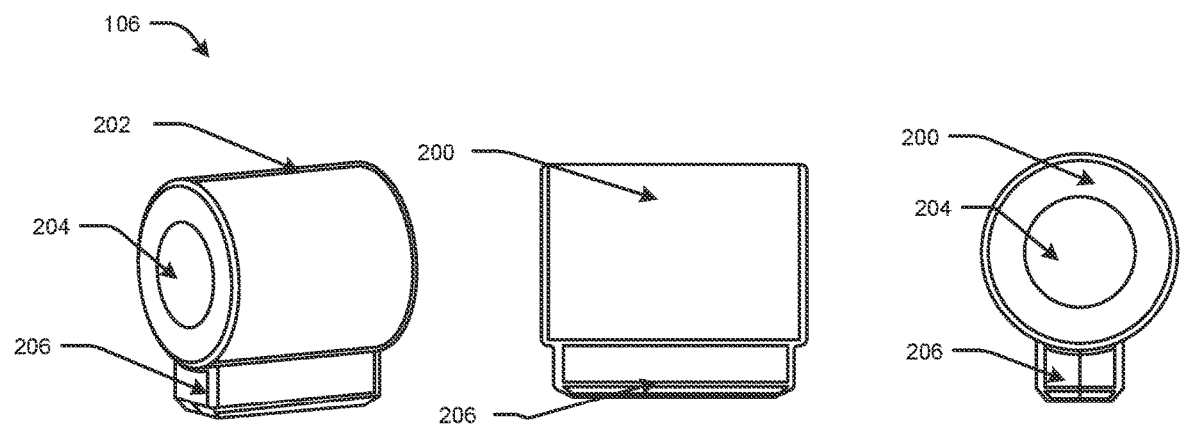
FIG. 2A illustrates exemplary isometric view, front view, and side view of a first embodiment of the elastic member of the proposed vane controller assembly, in accordance with an embodiment of the present invention.

Referring to FIG. 2A, in a first embodiment, the elastic member 106 can include an annular-shaped body portion 202, and a protrusion 206 extending along a length of the outer surface of the body portion 202 of the elastic member 106. The body portion 202 can have a hole 204 to accommodate the shaft 108. A first end of the protrusion 206 can be coupled to the outer surface of the body portion 202, and a second end of the protrusion 206 can be adapted to engage with or lock in the slot 112 of the knob 104.

Figure 2B:
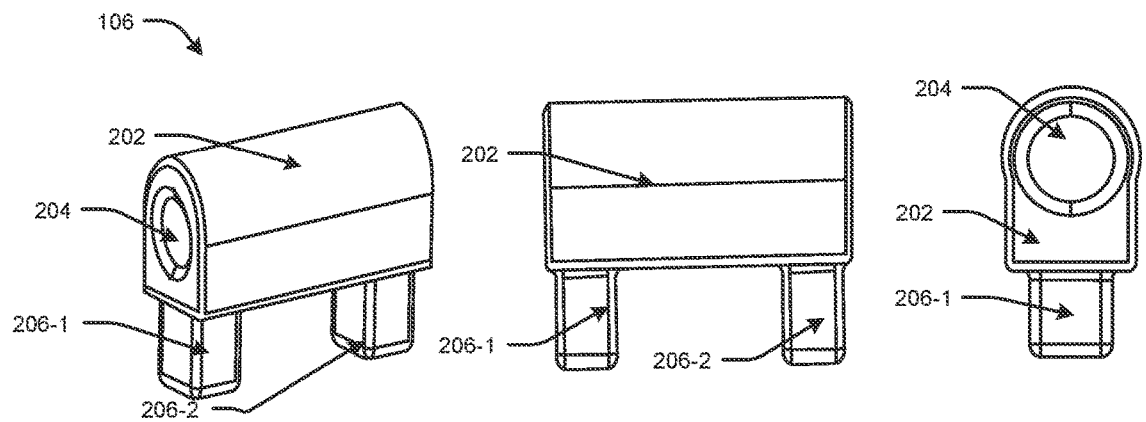
FIG. 2B illustrates exemplary isometric view, front view, and side view of a second embodiment of the elastic member of the proposed vane controller assembly, in accordance with an embodiment of the present invention.

Referring to FIG. 2B, in a second embodiment, the elastic member 106 can include an annular-shaped body portion 202, and two protrusions 206-1, 206-2 positioned at two ends on the outer surface of the body portion 202 of the elastic member 106. The body portion 202 can have a hole 202 to accommodate the shaft 108. Further, a first end of each of the two protrusions 206-1, 206-2 can be coupled to the outer surface of the body portion 202, and a second end of each of the two protrusions 206-1, 206-2 can be adapted to engage with or lock in the slot 112 of the knob 104.

Figure 2C:
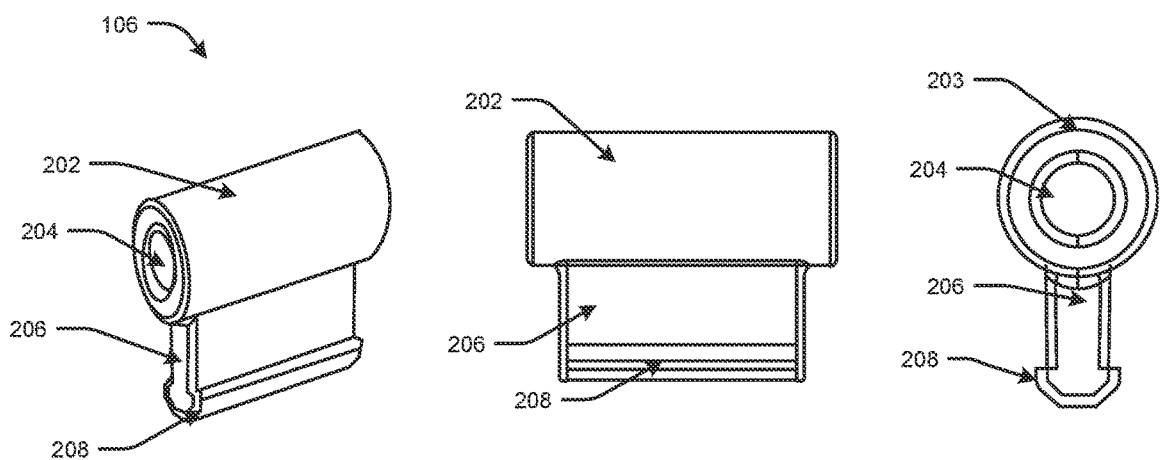
FIG. 2C illustrates exemplary isometric view, front view, and side view of a third embodiment of the elastic member of the proposed vane controller assembly, in accordance with an embodiment of the present invention.

Referring to FIG. 2C, in a third embodiment, the elastic member 106 can include an annular shaped body portion 202, and a protrusion 206 extending along length of the outer surface of the body portion 202 of the elastic member 106. The body portion 202 can have a hole 204 to accommodate the shaft 108. Further, a first end of the protrusion 206 can be coupled to the outer surface of the body portion 202, and a second end of the protrusion 206 can have an engaging end 208 adapted to efficiently engage with or lock in the slot 112 of the knob 104. The engaging end 208 can be profiled based on the shape of the slot 112 of the knob 104 to efficiently lock the protrusion 206 in the slot 112 of the knob 104.

FIGS. 3A-3J illustrate exemplary views of the steps involved in assembling of the proposed vane controller. As illustrated in FIG. 3A, the knob 104 of the proposed vane controller assembly 100 can accommodate the elastic member 106 at its first end such that the protrusion of the elastic member 106 engages and locks in the slot of the knob 104. Further, the deco panel 102 can include a notching spring 302 configured within it, as illustrated in FIG. 3B. The knob 104 having the elastic member 106 can then be slid within the deco panel 102 as shown in FIG. 3C such that the second end of the knob 104 is outside the deco panel 102 and is accessible for the user to maneuver the knob 104 as required. Furthermore, a knob fork 304 can be configured with the knob 104 and the deco panel 104 as illustrated in FIG. 3D, and the shaft 108 can be passed through the hole of the elastic member 106 of the knob 104, to movably configure the knob 104 with the shaft 108 as illustrated in FIG. 3E.

In an embodiment, as illustrated in FIG. 3F, the proposed vane controller 100 can include a horizontal vane link 110 that can be movably configured with the knob 104, and can be oriented perpendicular to the longitudinal axis of the shaft 108. The horizontal vane link 110 can include multiple engaging means at predefined distances to accommodate the horizontal vanes 306 of the vane controller assembly 100.

In an embodiment, as illustrated in FIGS. 3G and 3H, multiple horizontal vanes 306 can be coupled to the horizontal vane link 110, which is already movably configured with the knob 104 such that the horizontal vanes 306 can be rotated in an upward and downward direction about their longitudinal axis, and perpendicular to the longitudinal axis of the horizontal vane link 110, upon movement of the second end of the knob 104 by a user.

In an embodiment, as illustrated in FIG. 3I, the proposed vane controller 100 can include a vertical vane link 308 that can be movably configured with the knob 104, and oriented perpendicular to the longitudinal axis of the shaft 108. The vertical vane link 308 can include multiple engaging means at predefined positions to accommodate the vertical vanes 310 of the vane controller 100. The vertical vanes 310 can be coupled to the vertical vane link 308, which can be movably configured with the knob 104 such that the vertical vanes 310 can be rotated in left and right direction about their longitudinal axis, and perpendicular to the longitudinal axis of the vertical vane link 308, upon movement of the second end of the knob 104 by a user.

Figure 3J:
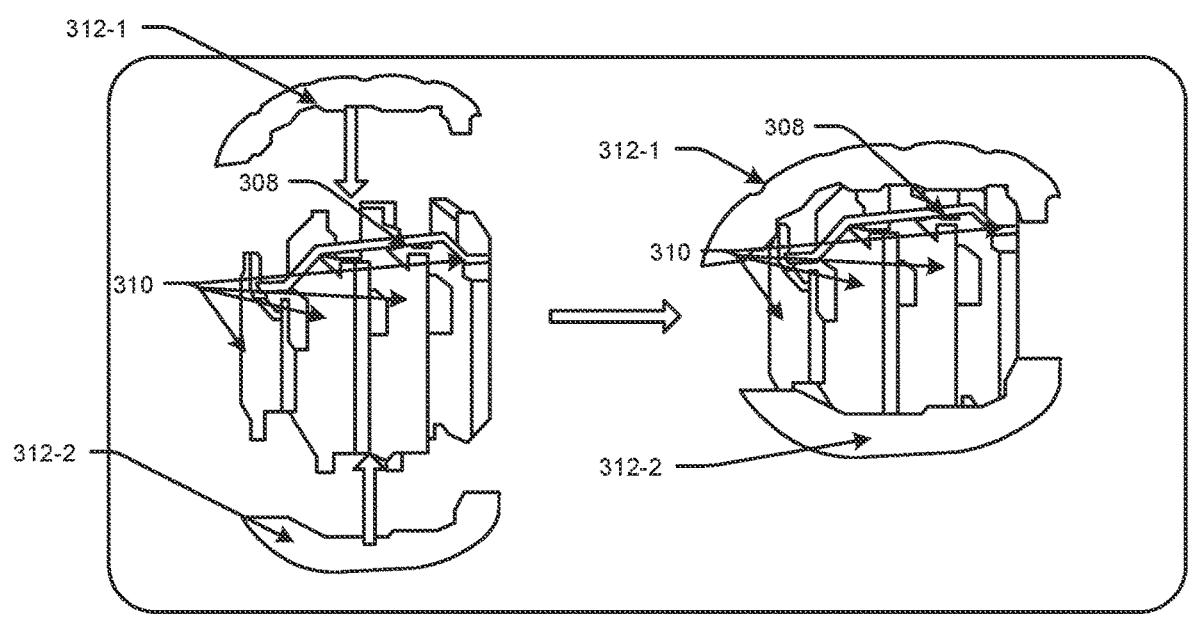

In an embodiment, as illustrated in FIG. 3J, the proposed vane controller 100 can include two vertical vane bearings 312-1, 312-2 configured on two opposite ends of the vertical vanes 310 such that each of the vertical vanes 310 is configured between the two vertical vane bearings 312-1, 312-2. The vane bearings 312-1, 312-2 can allow the vane controller assembly 100 to be fitted in the air vent without disturbing the rotation of the vertical vanes 310 about their axes.

Figure 4B:
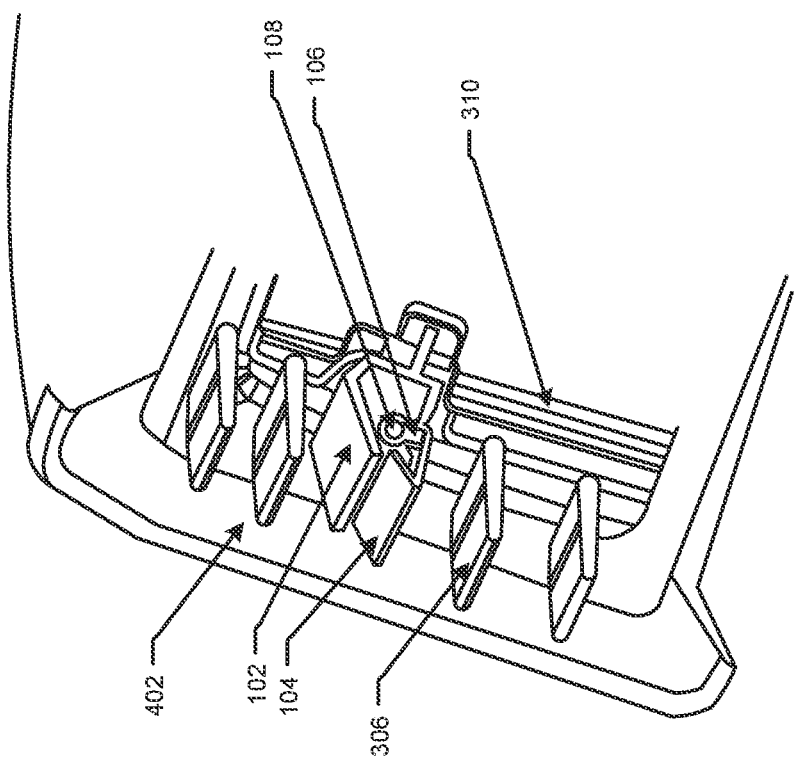
FIGS. 4A-4B illustrate an exemplary front view and z-sectional view, respectively, of the proposed vane controller being configured with an air vent of a vehicle, in accordance with an embodiment of the present invention
Figure 4A:
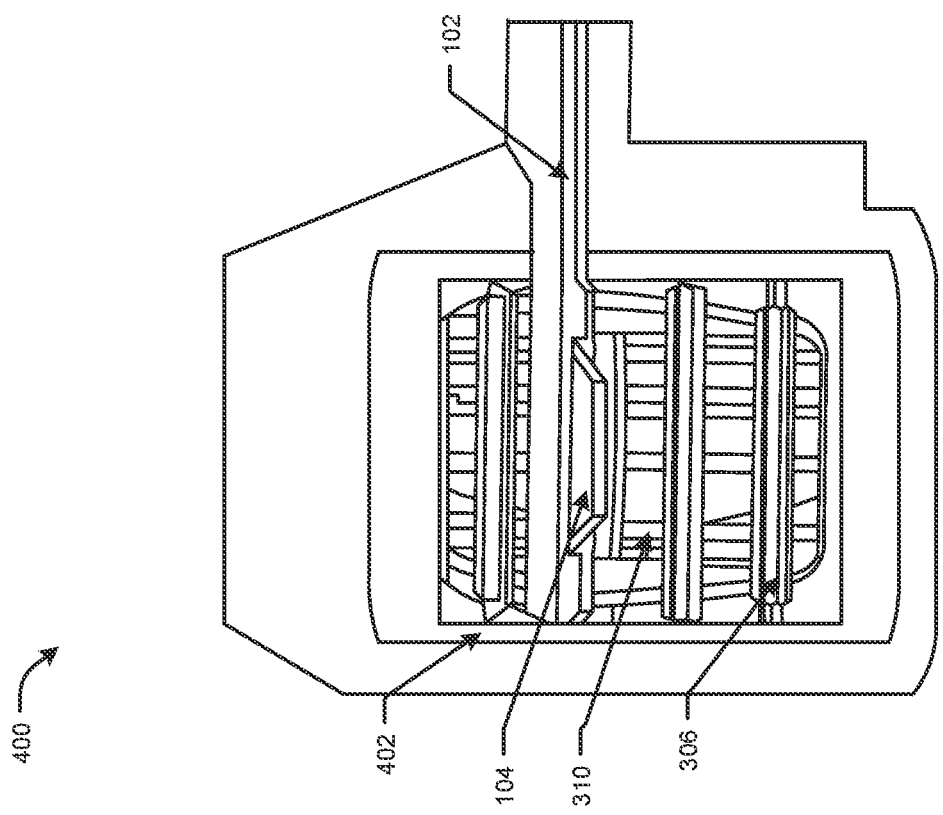

In an implementation, as illustrated in FIGS. 4A and 4B, the proposed vane controller 100 can be fitted into an air vent in an interior 400 of vehicles. The air vane controller 100 can be movably mounted around an axis secured to a dashboard, roof, rear side of the front seats, and other interior surfaces (collectively designated as 402, herein) of the vehicle. The air vent can be associated with any or a combination of a heating system, ventilation system, or air conditioning system (or HVAC system) of the vehicle, in the interior 400 of the vehicle to control the direction and inflow rate of air inside the vehicle. The knob 104 of the vane controller assembly 100 can be accessible to a user of the vehicle, and as the knob 104 is movably coupled to both the horizontal vanes 306, as well as the vertical vanes 310 using the horizontal vane link 110, and the vertical vane link 308, respectively, the knob 104 can allow the user to adjust the orientation of any or a combination of the horizontal vanes 306 and the vertical vanes 310 at the required angle, to control the direction and inflow rate of air inside the vehicles, thereby enabling multi-directional airflow inside the vehicles using a single controller (knob) 104.

In an implementation, when the knob 104 is in a neutral condition, all the horizontal vanes 306 remain perpendicular to a surface of the deco panel 102 and parallel to the longitudinal axis of the shaft 108, and the vertical vanes 310 remain perpendicular to the surface of the deco panel 102 and perpendicular to the longitudinal axis of the shaft 108, thereby enabling a straight flow of air inside the vehicle.

In an implementation, when the knob 104 is moved in a downward direction with respect to a surface of the deco panel 102, the horizontal vanes 306 rotate about their longitudinal axis in a downward direction and making a non-right angle (not perpendicular) with the surface of the deco panel 102, but the vertical vanes 310 remain perpendicular to the surface of the deco panel 102, thereby enabling a downward flow of the air inside the vehicle.

In an implementation, when the knob 104 is moved in the right direction with respect to the surface of the deco panel 102, the vertical vanes 310 rotate about their longitudinal axis in the right direction and making a non-right angle (not perpendicular) with the surface of the deco panel 102, but the horizontal vanes 306 remain parallel to the longitudinal axis of the shaft 108, thereby enabling a rightward flow of the air inside the vehicle.

In an implementation, when the knob 104 is moved in a down-right direction with respect to the deco panel 102, the horizontal vanes 306 rotate about their longitudinal axis in a downward direction and making a non-right angle (not perpendicular) with the surface of the deco panel 102, and the vertical vanes 310 rotate about their longitudinal axis in the right direction and making a non-right angle (not perpendicular) with the surface of the deco panel 102, thereby enabling inflow of air inside the vehicle in the down-right direction.

In an implementation, when the knob 102 is moved in an up-left direction with respect to the deco panel 102, the horizontal vanes 306 rotate about their longitudinal axis in an upward direction and making a non-right angle (not perpendicular) with the surface of the deco panel 102, and the vertical vanes 310 rotate about their longitudinal axis in the left direction and making a non-right angle (not perpendicular) with the surface of the deco panel 102, thereby enabling inflow of air inside the vehicle in the up-left direction.

Similarly, the movement of the knob 102, by a user, in a specific direction, can accordingly change the orientation of any or a combination of the vertical vanes 310 and the horizontal vanes 306 to adjust the direction of airflow inside the vehicle in the same specific direction of the knob 104.

It is to be appreciated by a person skilled in the art that while various embodiments and drawings of the present disclosure have been illustrated regarding a vane controller assembly for a vehicle being configured in an interior of the vehicle, however, the proposed vane controller assembly can also be fitted and configured in an interior as well as the exterior of an HVAC system of buildings, storage devices, refrigeration devices, but not limited to the likes, and all such embodiments are well within the scope of the present disclosure.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

Advantages of the Invention

The proposed invention provides a vane controller assembly to facilitate multi-directional airflow inside vehicles.

The proposed invention provides a simple, efficient, robust, easy to operate and assemble, and improved vane controller assembly controller for air vents of vehicles.

The proposed invention provides a vane controller assembly that is capable of efficiently accommodate multiple horizontal and vertical vanes, and facilitate efficient maneuverability of the multiple horizontal and vertical vanes.

The proposed invention enhances effort management, and reduces noise creation and damages to the components of the vane controller.

The proposed invention provides a structurally improved elastic member for the vane controller.

The proposed invention provides a structurally improved elastic member for the vane controller of air vents, which enhances effort management, reduces noise and damages to the components of the vane controller, and efficiently facilitate translational and rotational movement of the mounting rod as well as the deflectors of the vane controller upon movement of the knob.

The present invention provides an improved air vent assembly for vehicles, which is slim in profile, and aesthetically pleasing.

The invention claimed is:

1. A vane controller assembly for an air vent of a vehicle interior, the vane controller assembly comprising:
   a deco panel for fitment in the air vent;
   a knob movably coupled to the deco panel, the knob comprising a slot at a first end;
   an elastic member comprising a body portion having a hole, and one or more protrusions, wherein the one or more protrusions are configured on an outer surface of the body portion and is or are adapted to engage with the slot of the knob; and
   a shaft adapted to movably couple the knob to the deco panel, wherein the shaft passes through the hole of the body portion of the elastic member such that the elastic member is slidably and rotatably engaged with the shaft.

2. The vane controller assembly as claimed in claim 1, wherein an inner surface of the hole of the elastic member has a profile such that a portion of the inner surface of the hole is in contact with the shaft, and a gap is created between another portion of the inner surface of the hole and the shaft.

3. The vane controller assembly as claimed in claim 2, wherein the portion of the inner surface of the hole has a curved profile corresponding to the outer surface of the shaft, and the other portion of the inner surface of the hole has a flat profile.

4. The vane controller assembly as claimed in claim 1, wherein an outer surface of the shaft has a profile such that a portion of the outer surface of the shaft is in contact with the inner surface of the hole, and a gap is created between another portion of the outer surface of the shaft and the inner surface of the hole.

5. The vane controller assembly as claimed in claim 4, wherein the portion of the outer surface of the shaft has a curved profile corresponding to the inner surface of the hole, and the other portion of the outer surface of the shaft has a flat profile.

6. The vane controller assembly as claimed in claim 1, wherein the one or more protrusions extend along a length of the outer surface of the body portion of the elastic member.

7. The vane controller assembly as claimed in claim 1, wherein the one or more protrusions are configured at one or more predefined positions on the outer surface of the body portion of the elastic member.

8. The vane controller assembly as claimed in claim 1, wherein the elastic member is made of a material selected from silicon, rubber, and/or polymers.

9. The vane controller assembly as claimed in claim 1, wherein the vane controller assembly comprises a set of vertical vanes and a set of horizontal vanes, movably configured with the deco panel and the knob such that a second end of the knob facilitates adjustment of orientation of any or a combination of the set of vertical vanes, and the set of horizontal vanes at a predefined angle with the deco panel.

10. The vane controller assembly as claimed in claim 9, wherein the vane controller assembly comprises a horizontal link movably configured with the knob, the horizontal link adapted to accommodate the set of horizontal vanes, and wherein the vane controller assembly comprises a vertical link movably configured with the knob, the vertical link adapted to accommodate the set of vertical vanes.

* * * * *